United States Patent
Choi et al.

(10) Patent No.: US 11,840,124 B2
(45) Date of Patent: Dec. 12, 2023

(54) PIPING SYSTEM FOR AIR CONDITIONER

(71) Applicant: HS R & A Co., Ltd., Gyeongsangnam-do (KR)

(72) Inventors: Jae Hyeok Choi, Gyeongsangnam-do (KR); Deok Hyun Lim, Gyeongsangnam-do (KR); Young Jun Kim, Gyeongsangnam-do (KR); Seung Hoon Sung, Busan (KR); Kwon Sik Hwang, Busan (KR)

(73) Assignee: HS R & A CO., LTD., Gyeongsangnam-Do (KR)

( * ) Notice: Subject to any disclaimer, the term of this patent is extended or adjusted under 35 U.S.C. 154(b) by 117 days.

(21) Appl. No.: 17/521,211

(22) Filed: Nov. 8, 2021

(65) Prior Publication Data

US 2022/0153088 A1 May 19, 2022

(30) Foreign Application Priority Data

Nov. 18, 2020 (KR) .................. 10-2020-0154234

(51) Int. Cl.
*B60H 1/00* (2006.01)
*F16L 3/127* (2006.01)
*F16L 41/02* (2006.01)

(52) U.S. Cl.
CPC .......... *B60H 1/00571* (2013.01); *F16L 3/127* (2013.01); *F16L 41/021* (2013.01); *B60H 2001/006* (2013.01)

(58) Field of Classification Search
CPC ......... F16L 3/127; F16L 41/021; F16L 47/02; B60H 1/00571; B60H 2001/006; B29C 65/1635
See application file for complete search history.

(56) References Cited

U.S. PATENT DOCUMENTS

| 8,360,476 B2 | 1/2013 | Barden et al. |
| 11,318,683 B2* | 5/2022 | Shinohara ........... B29C 65/1635 |
| 2008/0315457 A1* | 12/2008 | Ueki ....................... F16L 47/06 285/332 |

(Continued)

FOREIGN PATENT DOCUMENTS

| EP | 2 677 220 A1 | 12/2013 |
| JP | 60-236825 A | 11/1985 |

(Continued)

OTHER PUBLICATIONS

Extended European Search Report dated Apr. 5, 2022 from corresponding European Application No. 21203386.4 (19 pages).

(Continued)

*Primary Examiner* — David Bochna

(74) *Attorney, Agent, or Firm* — Crowell & Moring LLP; John C. Freeman

(57) ABSTRACT

A piping system for an air conditioner that includes a refrigerant pipe that is formed of a plastic material and has a multi-layered pipe structure including an outer layer and an inner layer. The piping system provides a fluid flow between parts constituting the air conditioner system. A first flange formed of the plastic material and providing a connection between the refrigerant pipe and components constituting the air conditioner system. A second flange formed of the plastic material and connected to a charging valve for injecting a refrigerant into the refrigerant pipe.

10 Claims, 11 Drawing Sheets

(56) References Cited

U.S. PATENT DOCUMENTS

| | | |
|---|---|---|
| 2010/0116480 A1 | 5/2010 | Barden et al. |
| 2012/0216903 A1 | 8/2012 | Osborne |
| 2017/0097113 A1* | 4/2017 | Gresset ................ F16L 13/103 |
| 2020/0254712 A1 | 8/2020 | Tsuboi et al. |

FOREIGN PATENT DOCUMENTS

| | | |
|---|---|---|
| JP | H 10-14072 A | 1/1998 |
| JP | 2012-501423 A | 1/2012 |
| JP | 2020-019247 A | 2/2020 |
| KR | 20100087971 A | 8/2010 |
| KR | 10-2011-0061571 A | 6/2011 |
| KR | 10-1591943 B1 | 2/2016 |
| KR | 30-0958259 S | 5/2018 |
| KR | 10-2020-0061375 A | 6/2020 |
| WO | WO 2010/015922 A1 | 2/2010 |

OTHER PUBLICATIONS

Office Action dated Jul. 19, 2022 from corresponding Korean Application 10-2020-0154234 (10 pages including English translation).

Office Action dated Sep. 27, 2022 from corresponding Japanese Application 2021-178497 (10 pages including English translation).

* cited by examiner

PIPING SYSTEM FOR AIR CONDITIONER

CROSS-REFERENCE TO RELATED APPLICATION

This application is based on and claims priority under 35 U.S.C. § 119 to Korean Patent Priority No. 10-2020-0154234 filed on Nov. 18, 2020, in the Korean Intellectual Property Office, the entire disclosure of which is herein incorporated by reference in its entirety.

BACKGROUND

Field

The present invention relates to an air conditioner piping system, more specifically, each flange mounted on the refrigerant pipe and refrigerant pipe, which is the air conditioner pipe of the vehicle, is made of plastic material, by connecting the refrigerant pipe and each flange through laser fusion, light weight and vibration insulation is provided as well to minimize pressure loss of refrigerant fluid.

Description of Related Art

In general, a refrigeration cycle for operating a vehicle air conditioner is made by circulating a refrigerant through a compressor, a condenser, an expansion valve and an evaporator.

To this end, a compressor, a condenser, an expansion valve, and an evaporator are sequentially connected by a refrigerant pipe and a flange constituting an air conditioner piping system to form one refrigerant circulation circuit.

The refrigerant pipe and flange constituting the conventional air conditioner piping system are manufactured using a metal material such as aluminum, and the refrigerant pipe and the flange are connected using a caulking method, a brazing method, and a soldering method.

For reference, the caulking method refers to a method of press-fitting the refrigerant pipe into the fastening hole of the flange after forming to expand or compress, and the brazing and soldering method is a method in which only filler metal such as lead is melted between the base material and the base material (between the refrigerant pipe and the flange) so that the base material and the base material are metal-bonded.

However, the conventional air conditioning piping system has the following problems.

First, as the refrigerant pipe is made of aluminum, it is vulnerable to vehicle driving vibration and engine vibration, the local part of the refrigerant pipe is covered with a hose for vibration insulation, accordingly, there is a problem in that the structure of the air conditioner piping system is complicated and the cost increases due to an increase in the number of parts.

Second, due to the impact when connecting the refrigerant pipe and the flange with the caulking method or the brazing method, the diameter of the end (the portion fastened with the flange) of the refrigerant pipe is deformed or a step occurs, so there is a problem in that the diameter of the entire length of the refrigerant pipe is not constant, resulting in a pressure loss of the refrigerant fluid flowing in the refrigerant pipe.

Third, the impact when brazing welding between the refrigerant pipe and the flange is excessively transmitted to the refrigerant pipe or exceeding the proper temperature for brazing, there is a quality problem that the refrigerant pipe is unexpectedly damaged or punctured.

PRIOR ART

Korean Patent Registration No. 10-1510160

SUMMARY

The present invention has been devised to solve the problems of the prior art as described above, an object of the present invention is to manufacture a refrigerant pipe and each flange mounted on the refrigerant pipe of a plastic material having a vibration insulation effect, and connect the refrigerant pipe and the flange of a plastic material through laser fusion, which can prevent damage, so that providing an air conditioner piping system which may minimize the pressure loss of the refrigerant fluid by maintaining the same diameter over the entire length of the refrigerant pipe as well as providing a light weight and vibration insulation effect.

In order to achieve the above purpose, piping system for air conditioner of the present invention includes a refrigerant pipe that is formed of a plastic material and has a multi-layered pipe structure including an outer layer and an inner layer, and provides a fluid flow between the parts constituting the air conditioner system. At least one first flange formed of the plastic material and providing a connection between the refrigerant pipe and components constituting the air conditioner system. At least one second flange formed of the plastic material and connected to a charging valve for injecting a refrigerant into the refrigerant pipe, wherein the first flange is joined by laser fusion in a state in which one end of the refrigerant pipe is coupled. The second flange is joined by laser fusion in a state in which the lower portion of the second flange is seated in close contact with the upper portion of the outer circumferential surface of the refrigerant pipe, wherein the first flange includes a hollow body portion. A first connection pipe extending in the axial direction from one side of the body portion, provided with a coupling hole to which one end of the refrigerant pipe is coupled, and a positioning jaw for determining a position of the refrigerant pipe coupled to the coupling hole. A chip storage groove formed between the inner side of the first connection pipe and the outer side of the positioning jaw to collect chips generated during laser fusion between the refrigerant pipe and the first flange.

Through the air conditioner piping system according to the present invention, the following effects may be provided.

In the air conditioner piping system according to the present invention, the refrigerant pipe and each flange are made of a plastic material, thereby reducing weight and insulating driving and engine vibration by itself.

In addition, by bonding the plastic refrigerant pipe and each flange to each other by laser fusion method using heat by laser energy, the refrigerant pipe and each flange can be strongly coupled to each other without any damage (deformation, step, perforation, etc.).

In addition, as the refrigerant pipe and each flange are joined together without any damage by the laser welding method, the diameter of the entire length of the refrigerant pipe is maintained at the same diameter, thereby minimizing the pressure loss of the refrigerant fluid.

In addition, by manufacturing the refrigerant pipe in a multi-layered pipe structure including an outer layer and an inner layer, the refrigerant flowing into the refrigerant pipe is prevented from permeating to the outside, and it is possible to improve the rigidity and electrical insulation of the refrigerant pipe against external factors received from the outside.

In addition, as the chip storage groove is formed inside the first flange, it is possible to prevent the chips generated in the laser fusion process from being present on the first flange and mixing with the refrigerant.

In addition, by joining in a state of being seated in the refrigerant pipe using the seating portion of the second flange, the second flange may be simply mounted on the upper part of the refrigerant pipe.

BRIEF DESCRIPTION OF THE DRAWINGS

In relation to the description of the drawings, the same or similar reference numerals may be used for the same or similar constituent elements. The above and other aspects, features and advantages of certain embodiments of the disclosure will be more apparent from the following detailed description, taken in conjunction with the accompanying drawings, in which.

DETAILED DESCRIPTION

Figure 1:
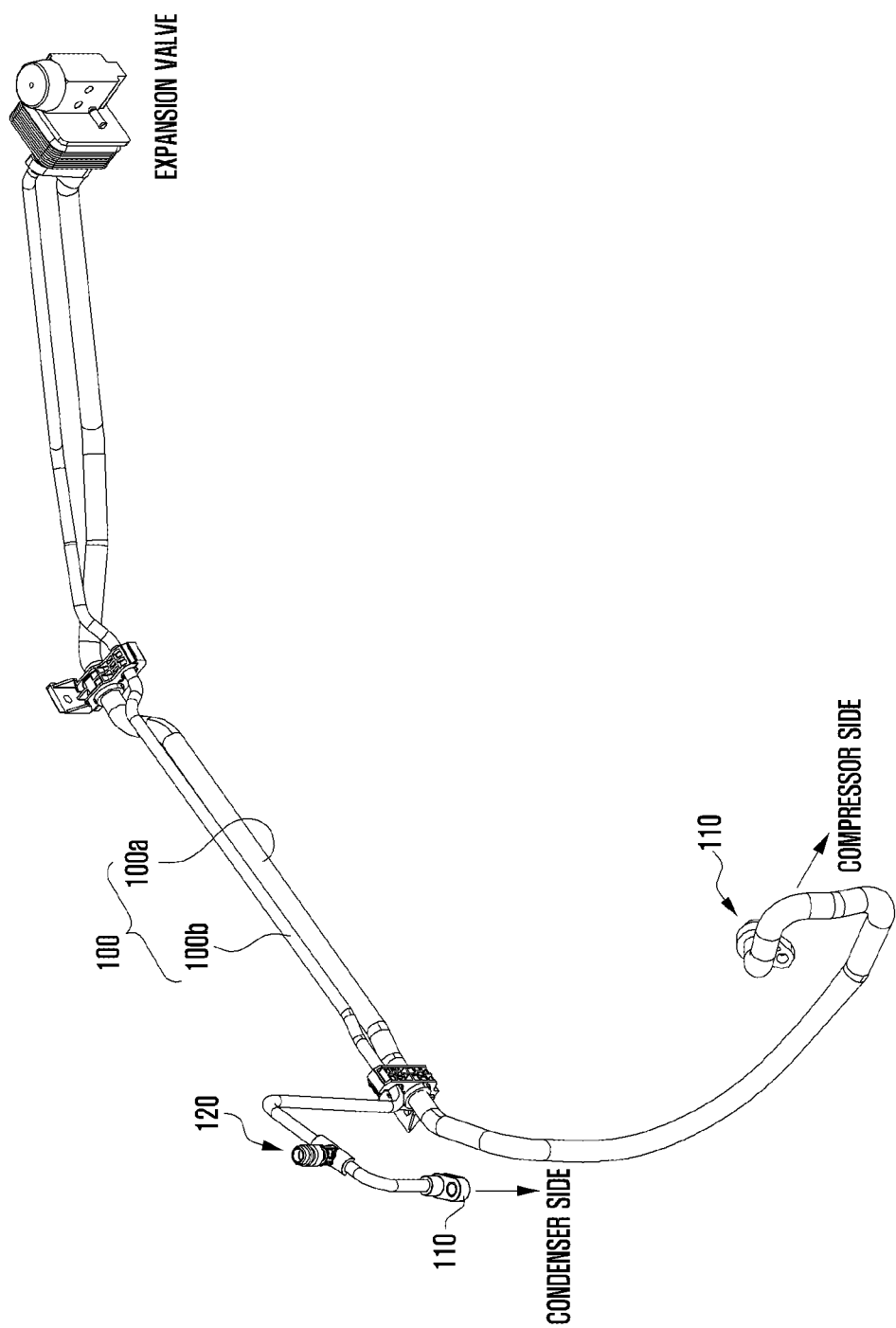
FIG. 1 is a perspective view schematically showing an air conditioner piping system according to an embodiment of the present invention.

Hereinafter, preferred embodiments according to the present invention will be described in detail with reference to the accompanying drawings. At this time, it should be noted that the same components in the accompanying drawings are indicated by the same reference numerals as much as possible. And detailed descriptions of well-known functions and configurations that may obscure the gist of the present invention will be omitted.

Hereinafter, an embodiment of the present invention will be described with reference to the accompanying drawings FIGS. 1 to 11.

Figure 2:
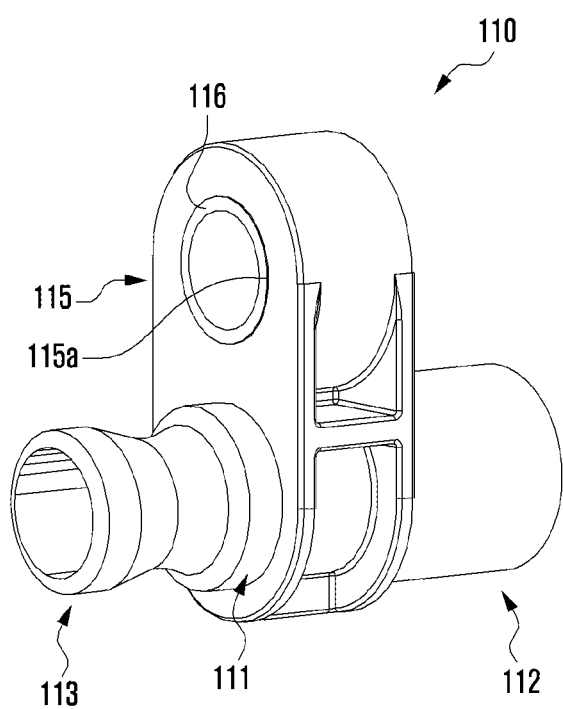
FIG. 2 is a perspective view schematically showing the structure of the first flange in an embodiment of the present invention.
Figure 3:
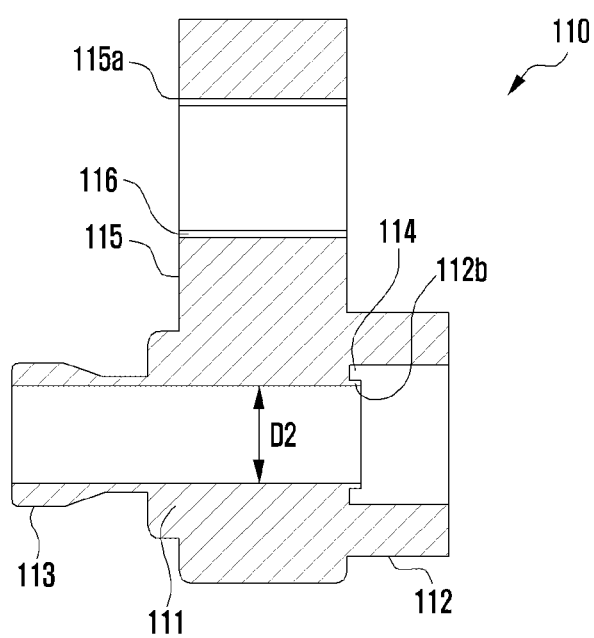
FIG. 3 is a view schematically showing a cross-sectional structure of a first flange according to an embodiment of the present invention.

FIG. 1 is a perspective view schematically showing an air conditioner piping system according to an embodiment of the present invention, and FIG. 2 is a perspective view schematically showing the structure of a first flange in an embodiment of the present invention, and FIG. 3 is a view schematically showing a cross-sectional structure of a first flange according to an embodiment of the present invention.

Figure 4:
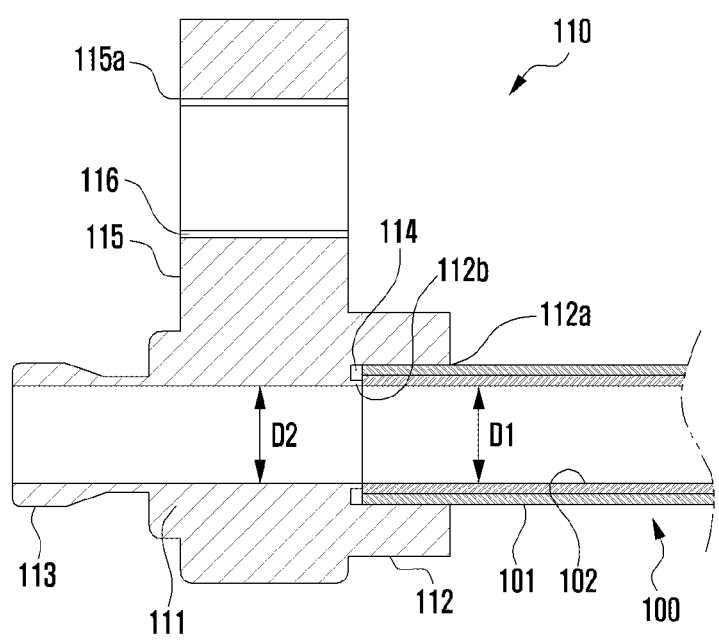
FIG. 4 is a cross-sectional view illustrating a state in which a refrigerant pipe is joined to a first flange according to an embodiment of the present invention.
Figure 5:
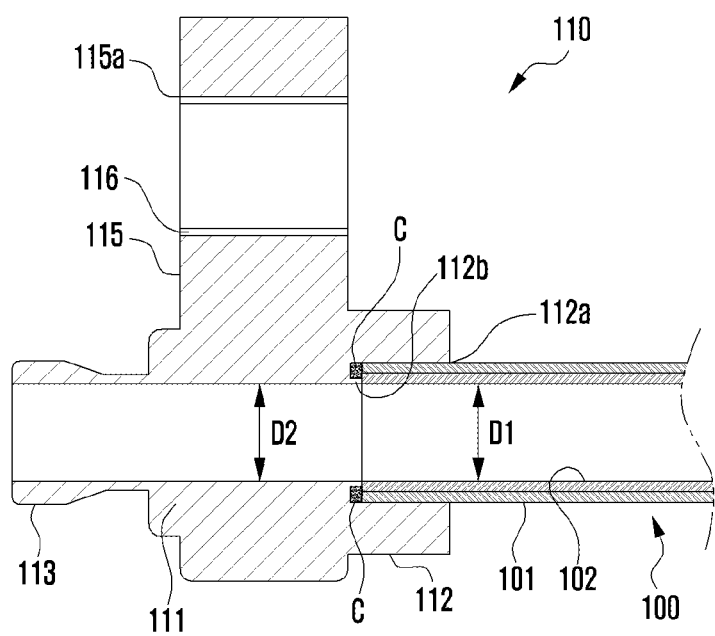
FIG. 5 is a view for explaining a state in which chips are gathered in a chip storage groove according to an embodiment of the present invention.
Figure 6:
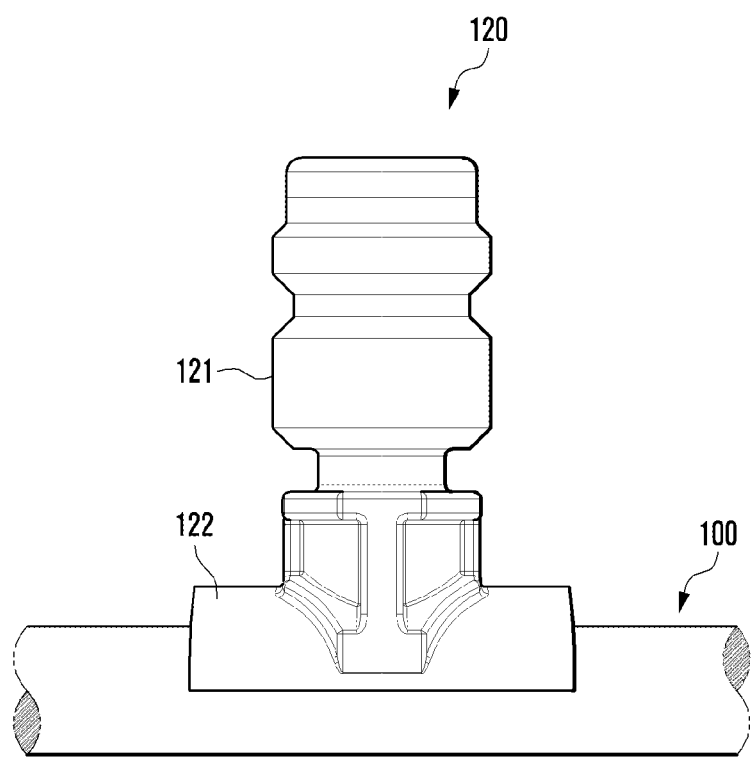
FIG. 6 is a view for explaining the structure of the second flange according to an embodiment of the present invention.
Figure 7:
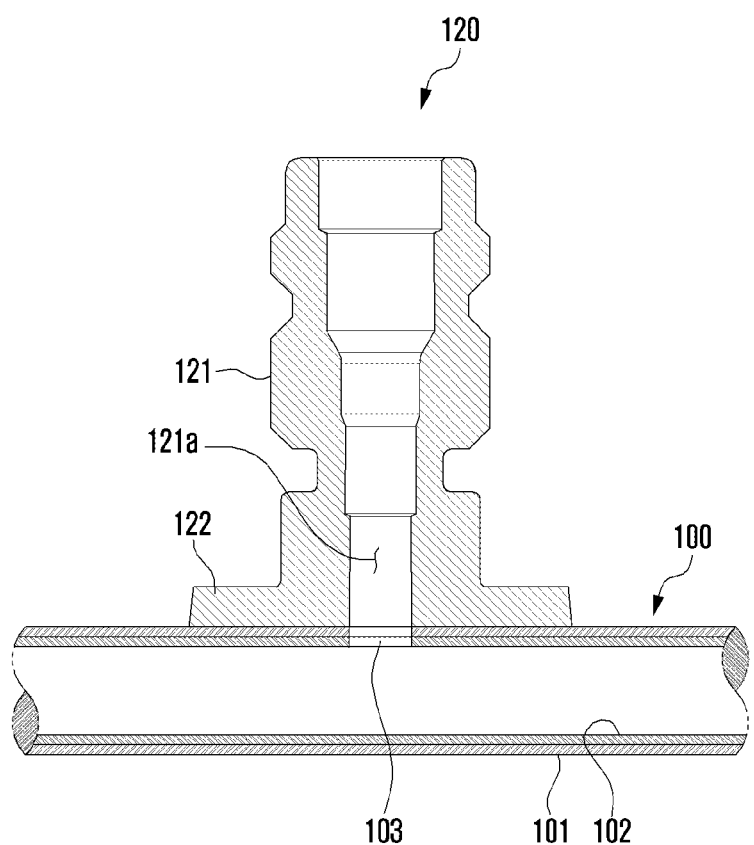
FIG. 7 is a view showing a cross-section of a state in which a second flange and a refrigerant pipe are joined according to an embodiment of the present invention.
Figure 8:
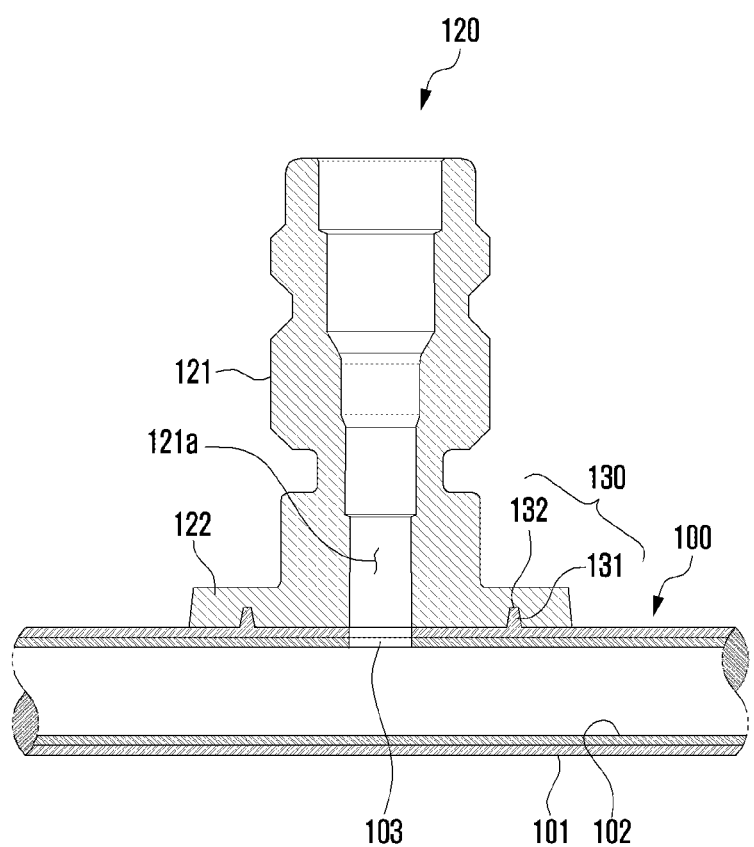
FIG. 8 is a view showing a cross-section of a state in which a second flange and a refrigerant pipe are coupled by a positioning means according to an embodiment of the present invention.

FIG. 4 is a cross-sectional view illustrating a state in which a refrigerant pipe is joined to a first flange according to an embodiment of the present invention, and FIG. 5 is a view for explaining a state in which chips are gathered in a chip storage groove according to an embodiment of the present invention, and FIG. 6 is a view for explaining the structure of the second flange according to an embodiment of the present invention, and FIG. 7 is a view showing a cross-section of a state in which a second flange and a refrigerant pipe are joined according to an embodiment of the present invention. FIG. 8 is a view showing a cross-section of a state in which a second flange and a refrigerant pipe are coupled by a positioning means according to an embodiment of the present invention.

Referring to FIG. 1, the refrigerant pipe 100 of the air conditioner piping system according to an embodiment of the present invention may be entirely formed of a plastic material.

The refrigerant pipe may connect, for example, between a compressor and an expansion valve, or between an expansion valve and a condenser, which are components constituting an air conditioner system of a vehicle. At this time, the refrigerant pipe 100 of the air conditioner piping system may include a refrigerant pipe 100a connecting the compressor and the expansion valve and a refrigerant pipe 100b connecting the condenser and the expansion valve, and the two refrigerant pipes 100a and 100b may be formed with the same structure, only different in diameter and length.

Referring to FIG. 4, the refrigerant pipe 100 according to an embodiment of the present invention may be formed in a multi-layered piping structure including, for example, an outer layer 101 and an inner layer 102.

For example, the outer layer 101 of the refrigerant pipe 100 may be formed of a Polyamide 6 (PA 6) material, and the inner layer 102 of the refrigerant pipe 100 may be formed of a Polyamide 612 (PA 612) material.

Polyamide 6 and Polyamide 612 are one of the engineering plastics formed from aliphatic polyamide materials.

At this time, Polyamide 6 has high tensile and impact strength, low chemical resistance, and high water absorption, and Polyamide 612 has a high heat deformation temperature of 190° C. or higher, flame retardancy, toughness, high chemical resistance, and low water absorption.

Polyamide 6 material is a material with high physical rigidity and low electrical conductivity, and when the outer layer 101 is formed of polyamide 6 material, the rigidity of the refrigerant pipe 100 against external factors received from the outside may be increased, and the electrical insulation may be improved.

The Polyamide 612 material is a material with low permeability to the refrigerant, and when the inner layer 102 is formed of the Polyamide 612 material, it is possible to prevent the refrigerant flowing into the refrigerant pipe 100 from being transmitted to the outside.

The refrigerant used in the vehicle air conditioner system may be a Freon-based refrigerant, for example, refrigerant R-12, R-22, etc. may be used, but is not limited thereto.

The refrigerant pipe 100 according to an embodiment of the present invention is connected to the parts constituting the air conditioner system through the first flange 110 formed of a plastic material to enable the flow of the refrigerant.

More specifically, the first flange 110 connects the refrigerant pipe 100 and the compressor, the expansion valve, and the condenser.

According to an embodiment of the present invention, a second flange 120 formed of a plastic material for connecting the refrigerant pipe 100 with a component for charging insufficient refrigerant into the inside of the refrigerant pipe 100 may be mounted on the upper portion of the refrigerant pipe 100. For example, the second flange 120 may be connected to a charging valve for injecting a refrigerant into the refrigerant pipe 100.

On the other hand, although not shown, when the arrangement path of the refrigerant pipe 100 is long, two refrigerant pipes 100 are provided, and the refrigerant pipe 100 and the refrigerant pipe 100 may be connected by a connection flange formed of a plastic material. At this time, in a state in which the two refrigerant pipes 100 are respectively coupled to both sides of the connecting flange, the connecting flange and the two refrigerant pipes 100 may be connected by joining each of the connecting flanges by laser fusion.

Accordingly, the compressor, condenser, expansion valve, and evaporator, which are components constituting the air conditioner system, are connected by the refrigerant pipe 100 and the first flange 110 made of plastic to form one refrigerant circulation circuit.

The refrigerant piping system according to the present invention is made by manufacturing the refrigerant pipe 100 and the first and second flanges 110 and 120 connecting various parts constituting the air conditioner system of plastic material, so that compared to the conventional refrigerant pipe made of aluminum, it is possible to reduce the weight of the entire air conditioner system.

In addition, since the refrigerant pipe 100 and the first and second flanges 110 and 120 are made of a plastic material, the effect of self-insulating driving and engine vibration may be improved.

On the other hand, when the refrigerant pipe and each flange are applied with an aluminum material, a separate part, such as a vibration insulation hose, is connected to the aluminum pipe to reduce driving and engine vibration, thereby there is a problem increasing the number of parts and cost.

However, as in this embodiment, since the refrigerant pipe 100 and the first and second flanges 110 and 120 are made of a plastic material, separate parts for driving and engine vibration reduction are not required, the number of parts and cost may be reduced.

According to an embodiment of the present invention, the junction between the first flange 110 and the refrigerant pipe 100 in a state in which the refrigerant pipe 100 is press-fitted to the first flange 110, and in a state in which the second flange 120 is seated on the upper portion of the refrigerant pipe 100, the junction between the second flange 120 and the refrigerant pipe 100 may be achieved by laser fusion welding using heat by laser energy.

At this time, the refrigerant pipe 100 is formed of a laser absorbing plastic material to which a laser absorbing pigment capable of absorbing laser beam energy during laser fusion is added, and the first flange 110 and the second flange 120 are preferably formed of a transmissive plastic material to which a laser transmissive pigment capable of transmitting laser beam energy is added.

According to an embodiment of the present invention, in the process of manufacturing the refrigerant pipe 100 from a laser-absorbing plastic material, to facilitate processing and extrusion molding of the refrigerant pipe 100, a filler (a chemical for improving processability or extrudability by polymer chains) may be added to the plastic material.

If the amount of the filler is large, extrusion moldability is good but heat resistance is poor, so the filler content is minimized so that the extruded refrigerant pipe 100 absorbs the heat of laser energy and has heat resistance to withstand.

In addition, the refrigerant pipe 100 may add a carbon black pigment, which is a laser absorbing pigment or a pigment material.

According to an embodiment of the present invention, in the process of manufacturing the first flange 110 and the second flange 120 from a laser-transmissive plastic material, in the plastic material for each flange, excluding carbon black pigment that affects the laser transmission amount, and adding dark blue pigment or white blue pigment which is a pigment or pigment material capable of laser transmission, are possible.

In a state in which one end of the refrigerant pipe 100 is press-fitted into the first flange 110 and the second flange 120 is seated in the refrigerant pipe 100, the laser beam energy irradiated from the outside of the first flange 110 or the second flange 120 passes through each of the flanges 110 and 120 and is absorbed into the refrigerant pipe 100.

Accordingly, thermal bonding is achieved by laser fusion between the refrigerant pipe 100 and the first flange 110 or the refrigerant pipe 100 and the second flange 120.

At this time, when the laser beam energy passes through each flange 110 formed of a laser-transmissive plastic material, and then is absorbed by the refrigerant pipe 100 formed of a laser-absorbing plastic material, the laser beam energy activates the molecules in the absorption layer, and the heat generated by the kinetic energy of the activated molecules melts the flange, as a result, the refrigerant pipe 100 and the first and second flanges 110 and 120, which are two base materials, are thermally joined.

In this way, by bonding the refrigerant pipe 100 made of plastic material and the first and second flanges 110 and 120 to each other by a laser fusion method using heat by laser energy, the refrigerant pipe 100 and the first and second flanges 110 and 120 may be strongly coupled to each other without any damage (deformation, step, perforation, etc.).

That is, due to the impact when connecting the refrigerant pipe and the flange made of aluminum with the caulking method or the brazing method, quality defects such as deformation, step, and perforation occurred in the connection part between the refrigerant pipe 100 and the flange in the past, but in the present invention, the plastic refrigerant pipe 100 and the first and second flanges 110 and 120 are interconnected by a laser fusion method using heat by laser energy, the refrigerant pipe 100 and the first and second flanges 110 and 120 may be strongly coupled to each other without any damage or defects (deformation, step, perforation, etc.).

In addition, as the refrigerant pipe 100 and the first and second flanges 110 and 120 are joined to each other without any damage by the laser fusion method, the diameter for the entire length of the refrigerant pipe 100 is maintained at the same diameter to minimize the pressure loss of the refrigerant fluid.

On the other hand, during laser fusion between the refrigerant pipe 100 and the first flange 110, the chip may fall off from the refrigerant pipe 100 or the first flange 110, and these chips may be mixed with the refrigerant and moved together with the refrigerant.

There is a problem in that the performance of each component connected to the refrigerant pipe, for example, a compressor, an expansion valve, and a condenser, may be deteriorated by the chip mixed with the refrigerant, and furthermore, the failure of each component may be caused.

Referring to FIGS. 4 and 5, according to an embodiment of the present invention, the first flange 110 may be provided with a chip storage groove 114 in which chips generated during laser fusion are stored between the inner side of the first connection pipe 112 and the outer side of the positioning jaw 112b to be described later.

At this time, it should be noted that the chip storage groove 114 may be formed in a circular groove shape between the inner side of the first connection pipe 112 and the outer side of the positioning jaw 112b, but is not limited thereto.

This chip storage groove portion may be integrally formed with the first flange 110 in the process of manufacturing the first flange 110 by a mold injection process.

When the bonding process by laser fusion between the first flange 110 and the refrigerant pipe 100 is described in more detail, one end of the refrigerant pipe 100 is coupled to the coupling hole 112a of the first connection pipe 112, and then a laser beam is irradiated from the outside of the first connection pipe 112, the laser beam energy is transmitted through the first flange 110 formed of a laser-transmissive plastic material.

At this time, the laser beam energy is absorbed by the refrigerant pipe 100 formed of a laser-absorbing plastic material to activate molecules in the absorption layer and the heat generated by the kinetic energy of the activated molecules melts the first flange 110, so that the refrigerant pipe 100 is thermally joined to the first flange 110 inside the first flange 110.

During laser welding, chips may fall off from the refrigerant pipe 100 or the first flange 110, but the chips are collected in the chip storage groove 114 formed between the inner side of the first connection pipe 112 and the positioning jaw 112b, it is possible to prevent the refrigerant flowing into the first flange from mixing with chips.

As a result, by preventing the chips from migrating with the refrigerant, it is possible to prevent reducing the performance of each component connected to the refrigerant pipe by the chip, for example, a compressor, an expansion valve, and a condenser, and further it is possible to prevent the failure of each component.

Hereinafter, the specific structure and connection relationship of the refrigerant pipe 100 and the first and second flanges 101 and 102 among the configuration of the air conditioner piping system according to the present invention will be described in detail.

Referring to FIGS. 2 to 5, the first flange 110 which is for interconnecting the refrigerant pipe 100 and components constituting the air conditioner system, may include the body portion 111 of the hollow structure penetrated from side to side, and the first connection pipe 112 extending in the axial direction from one side of the body portion 111 and connected to one end of the refrigerant pipe 100, and the second connecting pipe 113 which is formed extending in the axial direction from the other side of the body 111 and is fastened to the parts of the air conditioner system.

At this time, the first connection pipe 112 may provide a coupling hole 112a to which one end of the refrigerant pipe 100 is coupled, and a positioning jaw 112b for determining the position of the coolant pipe 100 coupled to the coupling hole 112a.

In addition, the second connecting pipe 113 is formed to extend from the other side of the body 111 in the axial direction, and the second connecting pipe 113 becomes a part fastened with components (compressor, condenser, etc.) of the air conditioner system.

On the other hand, a mounting end 115 having a mounting hole 115a is formed to extend integrally at a predetermined position on the outer peripheral surface of the body portion 111 of the first flange 110.

That is, when fixing the first flange 110 to a predetermined position of the vehicle body, the bolt is inserted through the mounting hole 115a of the mounting end 115 and bolted to the vehicle body, and the first flange 110 may be firmly fixed to the vehicle body while supporting the refrigerant pipe 100.

In addition, the mounting hole 115a of the mounting end 115 may be used for inserting and fixing the refrigerant pipe 100 passing around it.

On the other hand, it is preferable that the hollow metal member 116 is forcibly installed in the mounting hole 115a of the mounting end 115.

If there is no metal member 116 in the mounting hole 115a of the mounting end 115, damage or cracks may occur around the mounting hole 115a due to the tightening torque of the bolt fastened into the mounting hole 115a, but as the hollow metal member 116 is press-fitted into the mounting hole 115a of the mounting end 115, it is possible to prevent damage and cracks due to the tightening torque of the bolt.

On the other hand, the inner diameter (D1) of the refrigerant pipe 100 according to an embodiment of the present invention may be formed to be greater than or equal to the inner diameter (D2) of the first flange 110. At this time, the inner diameter (D1) of the refrigerant pipe 100 is preferably formed to be the same as the inner diameter (D2) of the first flange 110.

That is, as the inner diameter (D1) of the refrigerant pipe 100 and the inner diameter (D2) of the first flange 110 are formed to have the same size, it is possible to constantly maintain the flow rate of the refrigerant passing through the first flange 110 through the refrigerant pipe 100.

According to an embodiment of the present invention, the first flange 110 may be manufactured with a thermal stabilizer attached.

More specifically, the first flange 110 may change the external color of the refrigerant pipe 100 over time.

When the appearance of the first flange 110 is discolored, an aesthetic problem occurs. Therefore, in order to prevent discoloration of the appearance of the first flange 110, it is preferable to manufacture the first flange 110 by attaching a heat stabilizer.

As the heat stabilizer, for example, amine-based, organotin-based, carboxylate metal salt-based, lead-based, epoxy-based, and organic phosphite-based compounds may be used, but the present invention is not limited thereto.

Referring to FIGS. 6 and 7, the second flange 120 according to an embodiment of the present invention is a configuration for connecting a charging valve (not shown) for injecting a refrigerant into the refrigerant pipe 100 through an injection hole formed in the refrigerant pipe 100.

The second flange 120 may include a body portion 121 provided with a refrigerant movement space 121a communicating with the refrigerant injection hole 103, and a seating portion 122 that is formed at the lower end of the body portion 121 and is formed extending from the lower end of the body portion 121 to both sides, and is seated on the upper part of the refrigerant pipe 100 in order to join the body portion 121 with the refrigerant pipe 100.

At this time, it is preferable that the lower portion of the seating portion 122 is formed in a round structure so that the seating portion 122 can be disposed in close contact with the outer circumferential surface of the refrigerant pipe 100.

As the lower portion of the seating portion 122 forms a round structure, the lower portion of the seating portion 122 may be seated in close contact with the upper portion of the refrigerant pipe 100 formed in a circular shape.

According to an embodiment of the present invention, like the first flange 110, the second flange 120 may be manufactured by attaching a heat stabilizer. The feature manufactured by attaching a heat stabilizer to the second flange 120 is the same as the heat stabilizer attached to the first flange 110, detailed description is omitted.

Referring to FIG. 8, in the refrigerant piping system according to an embodiment of the present invention, when the second flange 120 is mounted on the upper portion of the refrigerant pipe 100, may further include a positioning means 130 for easily matching the position of the refrigerant injection hole 103 formed in the refrigerant pipe 100 and the position of the refrigerant movement space 121a formed in the body portion 121.

The positioning means 130 may include at least one positioning protrusion 131 formed to protrude from the outer peripheral surface of the refrigerant pipe 100 toward the seating portion 122, and at least one positioning groove 132 formed in the seating portion 122 to which the positioning protrusion 131 is coupled. Of course, the positioning protrusion 131 may be formed in the seating portion 122 and the positioning groove 132 may be formed in the refrigerant pipe 100.

Therefore, the seating portion 122 of the second flange 120 is easily seated on the upper portion of the refrigerant pipe 100 through the positioning means 130, and then the laser beam is irradiated from the outside of the second flange 120, the laser beam energy is transmitted through the second flange 120 formed of a laser-transmissive plastic material.

At this time, the laser beam energy is absorbed by the refrigerant pipe 100 formed of a laser-absorbing plastic material to activate molecules in the absorption layer, and heat generated by the kinetic energy of the activated molecules melts the second flange 120, as a result, the second flange 120 is thermally bonded to the upper portion of the refrigerant pipe 100.

Figure 9:
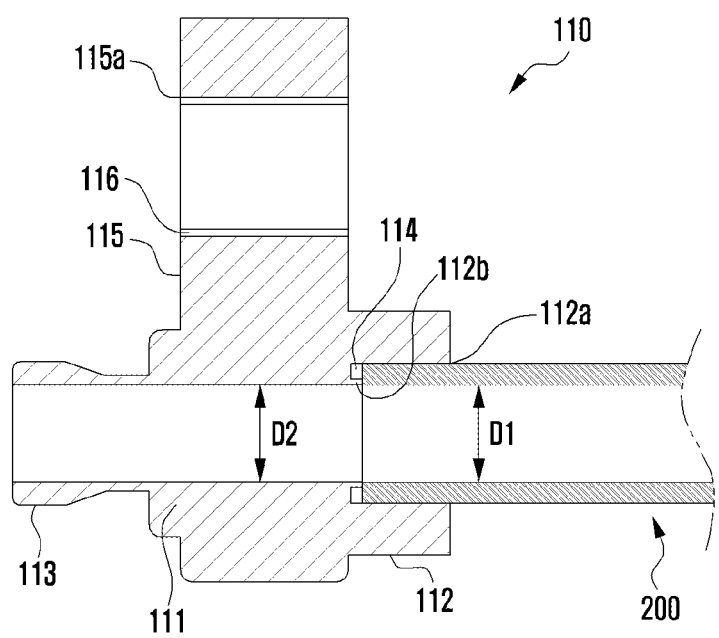
FIGS. 9 and 10 are views schematically illustrating a state in which a refrigerant pipe having a single-layer structure is applied as another example of a refrigerant pipe according to an embodiment of the present invention.
Figure 10:
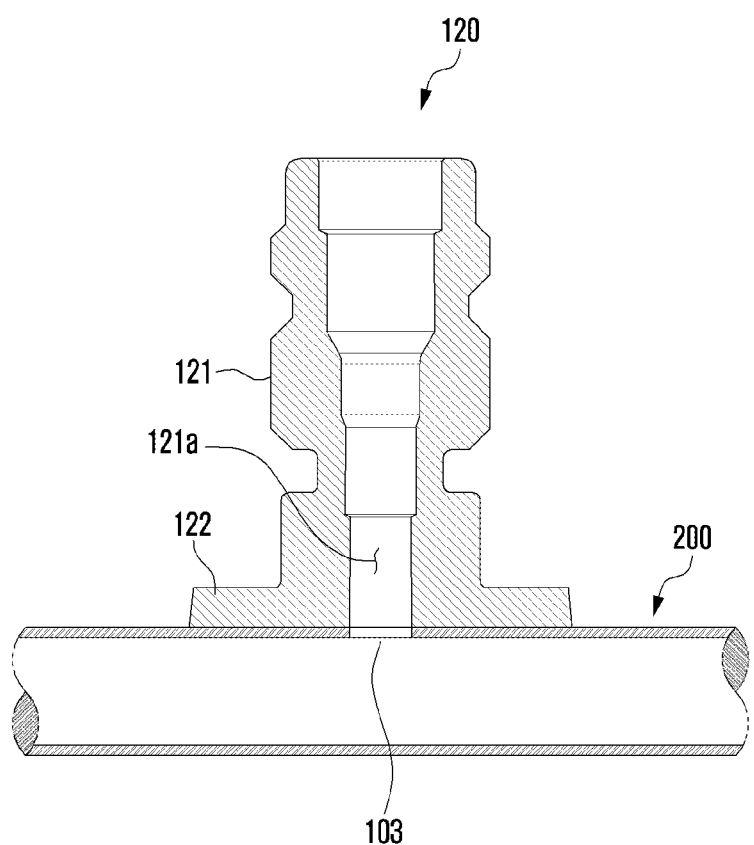

FIGS. 9 and 10 are views schematically illustrating a state in which a refrigerant pipe having a single-layer structure is applied as another example of a refrigerant pipe according to an embodiment of the present invention.

Referring to FIGS. 9 and 10, as another example of a refrigerant pipe according to an embodiment of the present invention, the refrigerant pipe 200 of a single-layer structure may be applied instead of the refrigerant pipe 100 of the above-described multi-layer structure.

Figure 11:
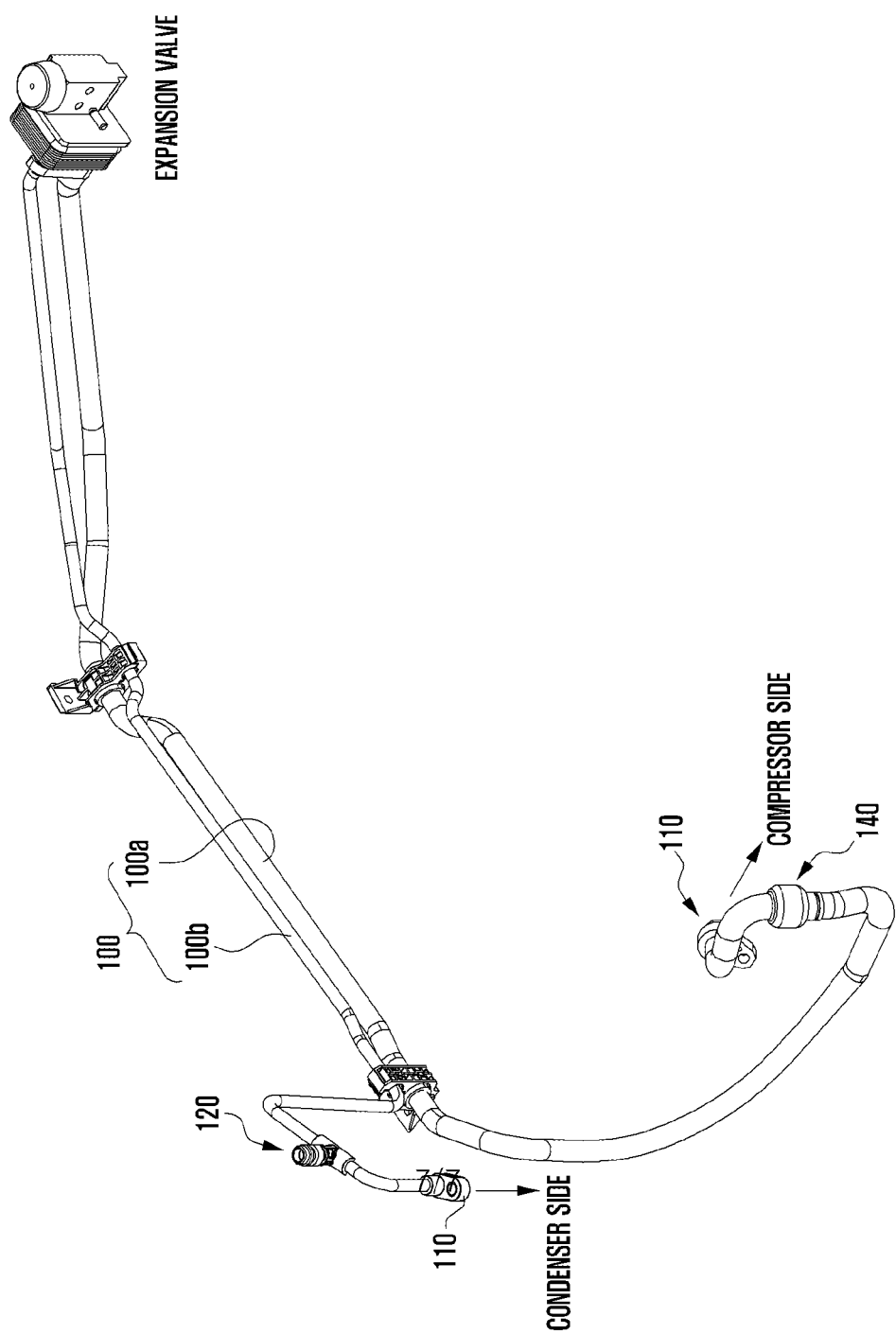
FIG. 11 is a view schematically illustrating a state in which a silencer is installed in a refrigerant piping system according to an embodiment of the present invention.

FIG. 11 is a view schematically illustrating a state in which a silencer is installed in a refrigerant piping system according to an embodiment of the present invention.

Referring to FIG. 11, a silencer 140 for reducing vibration noise in the refrigerant piping system according to an embodiment of the present invention may be provided in the refrigerant pipe 100.

At this time, the silencer 140 may be formed of a plastic material, and the silencer 140 may be joined through laser fusion in a state in which it is coupled to the refrigerant pipe 100.

Here, the laser welding process between the refrigerant pipe 100 and the silencer 140 is the same as the laser welding process of the above-described refrigerant pipe 100 and each of the flanges 110 and 120, so a detailed description will be omitted.

As described above, in the air conditioner piping system according to the present invention, the refrigerant pipe and each flange are made of a plastic material, thereby reducing weight and insulating driving and engine vibration by itself.

In addition, by bonding the plastic refrigerant pipe and each flange to each other by laser fusion method using heat by laser energy, the refrigerant pipe and each flange can be strongly coupled to each other without any damage (deformation, step, perforation, etc.).

In addition, as the refrigerant pipe and each flange are joined together without any damage by the laser welding method, the diameter of the entire length of the refrigerant pipe is maintained at the same diameter, thereby minimizing the pressure loss of the refrigerant fluid.

In addition, by manufacturing the refrigerant pipe in a multi-layered pipe structure including an outer layer and an inner layer, the refrigerant flowing into the refrigerant pipe is prevented from permeating to the outside, and it is possible to improve the rigidity and electrical insulation of the refrigerant pipe against external factors received from the outside.

In addition, as the chip storage groove is formed inside the first flange, it is possible to prevent the chips generated in the laser fusion process from being present on the first flange and mixing with the refrigerant.

In addition, by joining in a state of being seated in the refrigerant pipe using the seating portion of the second flange, the second flange may be simply mounted on the upper part of the refrigerant pipe.

As described above, the present invention has been described by way of example, but it is not necessarily limited thereto, and any number of modifications and variations are possible within the scope of the technical spirit of the present invention.

DESCRIPTION OF REFERENCE NUMERALS

| | |
|---|---|
| 100: refrigerant pipe | 101: outer layer |
| 102: inner layer | 103: refrigerant injection hole |
| 110: first flange | 111: body portion |
| 112: first connection pipe | 112a: coupling hole |
| 112b: positioning jaw | 113: second connection pipe |
| 114: chip storage groove | 115: mounting end |
| 115a: mounting hole | 116: metal member |
| 120: second flange | 121: body portion |
| 121a: refrigerant movement space | 122: seating portion |
| 130: positioning means | 131: positioning protrusion |
| 132: positioning groove | 140: silencer |

What is claimed is:

1. A piping system for air conditioner comprising:
   a refrigerant pipe that is formed of a plastic material and comprises a multi-layered pipe structure comprising an outer layer and an inner layer, and provides a fluid flow between the parts constituting an air conditioner system;
   a first flange formed of the plastic material and providing a connection between the refrigerant pipe and components constituting the air conditioner system;
   a second flange formed of the plastic material and connected to a charging valve for injecting a refrigerant into the refrigerant pipe, wherein the first flange is joined by laser fusion in a state in which one end of the refrigerant pipe is coupled, the second flange is joined by laser fusion in a state in which a lower portion of the second flange is seated in close contact with an upper portion of an outer circumferential surface of the refrigerant pipe, wherein the first flange comprises:
- a hollow body portion;
- a connection pipe extending in an axial direction from one side of the hollow body portion, provided with a coupling hole to which the one end of the refrigerant pipe is coupled, and a positioning jaw for determining a position of the refrigerant pipe coupled to the coupling hole; and
- a chip storage groove formed between an inner side of the connection pipe and an outer side of the positioning jaw to collect chips generated during laser fusion between the refrigerant pipe and the first flange;

wherein the refrigerant pipe is equipped with a silencer for reducing vibration noise caused by the refrigerant flowing into the refrigerant pipe, and wherein the silencer is formed of a plastic material, and the silencer is joined through laser fusion in a state in which it is coupled to the refrigerant pipe.

2. The piping system for the air conditioner of claim 1, wherein the refrigerant pipe is formed of a laser-absorbing plastic material, and the first flange is formed of a laser-transmissive plastic material; and in a state where the one end of the refrigerant pipe is coupled within the first flange, laser energy transmitted through and irradiated from an outside of the first flange is absorbed into the refrigerant pipe, bonding by laser fusion between the refrigerant pipe and the first flange is accomplished.

3. The piping system for the air conditioner of claim 1, wherein the refrigerant pipe is formed of a laser-absorbing plastic material, and the second flange is formed of a laser-transmissive plastic material, and in a state in which the second flange is seated on an upper portion of the refrigerant pipe, laser energy transmitted through and irradiated from an outside of the second flange is absorbed into the refrigerant pipe, bonding by laser fusion between the refrigerant pipe and the second flange is accomplished.

4. The piping system for the air conditioner of claim 1, wherein the outer layer of the refrigerant pipe is formed of a polyamide 6 (PA6) material, and the inner layer of the refrigerant pipe is formed of a polyamide 612 (PA612) material.

5. The piping system for the air conditioner of claim 1, wherein the first flange comprises:

- a second connection pipe extending in the axial direction from another side of the hollow body portion and fastened to the components of the air conditioner system;
- a mounting end which is integrally formed on the outer circumferential surface of the body and has a mounting hole for fixing the first flange to a vehicle body, wherein after the refrigerant pipe is coupled to the coupling hole, laser energy transmitted and irradiated from an outside of the connection pipe is absorbed into the refrigerant pipe, so that the refrigerant pipe is laser-fused to the connection pipe to be bonded to each other.

6. The piping system for the air conditioner of claim 5, wherein a hollow metal member is forcibly press-fitted into the mounting hole.

7. The piping system for the air conditioner of claim 1, wherein in order to prevent discoloration of the first flange, a heat stabilizer is added to the first flange.

8. The piping system for the air conditioner of claim 1, wherein the second flange comprises:

- a second body portion provided with a refrigerant movement space communicating with a refrigerant injection hole and a charging valve for injecting the refrigerant into the refrigerant injection hole that is formed in the refrigerant pipe is connected; and
- a seating portion formed at a lower end of the second body portion, extending from a lower end of the second body portion and seated on an upper part of the refrigerant pipe, wherein after the seating portion is seated on the upper part of the refrigerant pipe, laser energy transmitted and irradiated from an outside of the seating portion is absorbed into the refrigerant pipe, and the seating portion is laser-fused to the upper part of the refrigerant pipe to bond with each other.

9. The piping system for the air conditioner of claim 8, wherein a lower part of the seating portion is formed in a round structure so as to be in close contact with an outer circumferential surface of the refrigerant pipe.

10. The piping system for the air conditioner of claim 8, further comprising:

- a positioning means for easily matching the position of the refrigerant injection hole and the position of the refrigerant movement space when the seating portion is mounted on the upper part of the refrigerant pipe, wherein the positioning means comprises:
- a positioning protrusion formed to protrude from the outer circumferential surface of the refrigerant pipe toward the seating portion; and
- a positioning groove formed concavely in the seating portion to which the positioning protrusion is coupled.

* * * * *